United States Patent [19]

Kobayashi et al.

[11] Patent Number: 5,737,183
[45] Date of Patent: Apr. 7, 1998

[54] COMPACT PORTABLE COMPUTER HAVING A RISER THAT FORMS WHEN A COVER IS OPENED

[75] Inventors: Makoto Kobayashi, Machida; Yasutaka Koga, Kawasaki, both of Japan

[73] Assignee: Ricoh Company, Ltd., Tokyo, Japan

[21] Appl. No.: 645,389

[22] Filed: May 13, 1996

[30] Foreign Application Priority Data

May 12, 1995 [JP] Japan .................. 7-114763

[51] Int. Cl.⁶ .................. G06F 1/16; H05K 5/03; E05D 3/06; B65D 25/24
[52] U.S. Cl. .................. 361/683; 361/681; 16/366; 248/685; 248/923; 206/45.23
[58] Field of Search .................. 364/708.1; 235/1 D; 206/45.2, 45.23, 305, 320; 220/212, 212.5; 312/223.2; 16/366, 368; 248/685, 688, 917, 923; 361/679–683

[56] References Cited

U.S. PATENT DOCUMENTS

| | | | |
|---|---|---|---|
| 4,259,568 | 3/1981 | Dynesen | 235/1 D |
| 4,703,161 | 10/1987 | McLean | 235/1 D |
| 5,002,184 | 3/1991 | Lloyd | 206/305 |
| 5,078,159 | 1/1992 | Yuhara | 206/45.23 X |
| 5,128,829 | 7/1992 | Loew | 361/683 |
| 5,555,157 | 9/1996 | Moller et al. | 361/683 |

FOREIGN PATENT DOCUMENTS 62-62365  4/1987  Japan .

*Primary Examiner*—Michael W. Phillips
*Attorney, Agent, or Firm*—Oblon, Spivak, McClelland, Maier & Neustadt, P.C.

[57] ABSTRACT

A portable computer capable of operating on a flat surface or on an operator's palm and forearm, including a main body, a display on an upper side of the main body for displaying image or character data or both, a cover which covers the display and opens rotatably to a position where an upper side of the cover touches a bottom side of the main body, a riser formed when the cover is opened which raises the main body to a position so to form an angle relative to the flat surface, when supported on the flat surface, and for stabilizing the computer when held by the operator on the operator's palm and forearm. The cover opens and closes with the assistance of first and second hinge pins. An edge portion of the cover and a stand plate extend in generally opposite directions about the first hinge pin when the cover is closed, but are adjacent to one another when the cover is opened. The stand plate is positioned adjacent to the main body when the cover is closed, but is positioned in an opposite direction about the second hinge pin from a holder when the cover is opened.

10 Claims, 6 Drawing Sheets

COMPACT PORTABLE COMPUTER HAVING A RISER THAT FORMS WHEN A COVER IS OPENED

BACKGROUND OF THE INVENTION

1. Field of the Invention

This invention generally relates to a portable computer and more particularly to a compact portable computer for operating on a desk or on an operator's palm and forearm.

2. Discussion of the Background

Generally, portable computers and calculators that operate on a desk or on an operator's palm and arm have covers for protecting the display from shock.

FIG. 8 illustrates a first example of such a prior art portable calculator, including a main body 21, a liquid crystal display (LCD) 22, and a cover 23 which consists of a holder portion 23a and a main cover portion 23b. A hinge 24 forms a rotatable joint and attaches to the holder portion 23a for opening the cover 23 rotatably when desired. The main cover portion 23b also functions as a stand which makes an angle 50 between main body 23 and a desk (not shown). This type of calculator is disclosed in Japanese Laid-Open Utility Model Publication No. 62365/1987.

However, the angle 50 formed between the main body 21 and the desk is decided by a length of the main cover portion 23b. Because the main cover portion 23b functions both as a stand and a cover and has only one rotatable joint, the angle 50 set by the stand is directly related to the length "L" of the display.

When the display length "L" is long, the main cover portion 23b must also be long, and thus the angle 50 formed between the main body 23 and the desk is so steep that it makes it very awkward for an operator to operate the calculator comfortably.

FIGS. 9A and 9B illustrate a second example of a prior art personal computer, including main body 31, a cover 33, and a stand 27. FIG. 9A illustrates the cover 33 closed on the main body 31, and FIG. 9B illustrates the cover 33 when opened. In FIG. 9B, stand 27 places main body 31 at an angle 51 relative to a desk (not shown), where the desk underlies opened cover 33.

However, this arrangement is not convenient for an operator to hold the personal computer on the operator's palm and arm because the operator must stabilize the personal computer by holding an upper side of the main body 31, while simultaneously supporting the stand 27, and a bottom side of cover 33. Thus, without a convenient means for stabilizing the portable computer, it is very awkward for an operator to use this prior art personal computer.

SUMMARY OF THE INVENTION

It is therefore an object of the present invention to provide an information processing apparatus with an operation panel in which the above-mentioned disadvantages are eliminated.

The above object and other objects are achieved according to the present invention by providing a more compact portable computer including a main body, a display disposed on an upper side of the main body for displaying image or character data or both, a cover for covering the display and that opens rotatably to a position where an upper side of the cover touches a bottom side of the main body, and a riser formed on one side of the main body when the cover is opened and when operated on a flat surface to position the main body at an angle relative to the flat surface, and for stabilizing the portable computer when supported on an operator's palm and forearm. The cover opens and closes with the assistance of first and second hinge pins. An edge portion of the cover and a stand plate extend in generally opposite directions about the first hinge pin when the cover is closed, but are adjacent to one another when the cover is opened. The stand plate is positioned adjacent to the main body when the cover is closed, but is positioned in an opposite direction about the second hinge pin from a holder when the cover is opened.

In one embodiment of the present invention, the riser includes opposing protrusions formed when the cover is rotated to an opened position.

Preferably, each opposing protrusion includes a holder, including a holder hinge, disposed on the main body; a first hinge formed on one side of a stand, the first hinge interlocking with the holder hinge to form a first rotatable joint for storing and releasing the stand; a second hinge formed on an opposite side of the stand; and a cover including a cover hinge that interlocks with the second hinge for forming a rotatable joint for opening and closing the cover.

Preferably, the display includes a touch panel for inputting data to the portable computer when touched by a means for touching including a pen and a finger.

As a further aspect of the invention, the cover includes an edge portion having an "L-shaped" cross-section.

As a further aspect of the invention, the cover has a convex shaped portion corresponding to a concave shaped portion formed in the main body.

As a further aspect of the invention, the main body has a stopper which latches the cover on the concave shaped surface formed in the main body.

As a further aspect of the invention, the cover has a cover notch formed in a center of an edge of the cover.

As a further aspect of the invention, the stand has a stand notch which corresponds to the cover's notch.

As a further aspect of the invention, the portable computer includes a holder that rotatably attaches a stand to the main body, and includes means for detaching the stand from the main body.

As a further aspect of the invention, the holder is detachably attached to the main body, e.g., by means of a screw.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
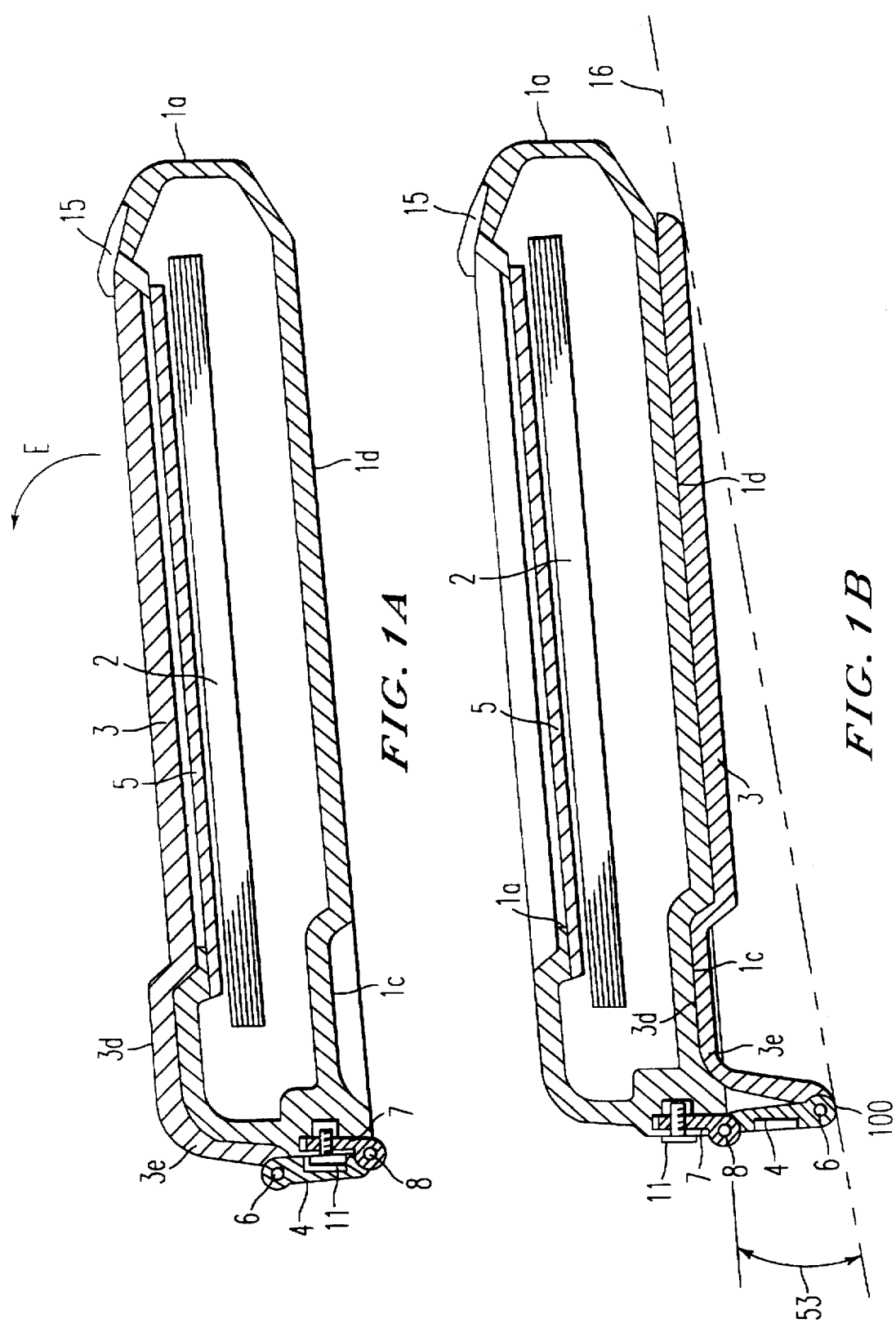
FIG. 1A is a cross-sectional view of a portable computer of the present invention shown with the display cover closed and stand stored.
FIG. 1B is a cross-sectional view of the portable computer of the present invention shown with the display cover opened and stand released.

Referring now to the drawings, wherein like reference numerals designate identical or corresponding parts throughout the several views, and more particularly to FIGS. 1A and 1B thereof, which are cross-sectional views a portable computer 1 with its cover 3 in a closed and opened position respectively. From FIGS. 1A and 1B it is seen that opening the cover 3 in the direction "E" (as shown in FIG. 1A) reveals the touch panel 5. Touch panel 5 is a user interface for the portable computer and allows operators to input data to the portable computer and view image and character data displayed by the portable computer. FIG. 1B shows that when a stand 4 is released, the portable computer is positioned at a convenient angle 53 relative to a flat surface for supporting the portable computer.

More particularly, the cover has an edge portion 3e that rotates about a hinge pin 6. A first end of a stand 4 attaches to the hinge pin 6, such that when the cover 3 is closed, the stand 4 serves as a leaf and the edge portion 3e serves as another leaf of a first rotatable joint hinged at the hinge pin 6.

A holder 7 is configured to receive another hinge pin 8, and a second end of the stand 4 attaches to the hinge pin 8, such that the holder 7 serves as a leaf and the second end of the stand 4 serves as another leaf of a second rotatable joint hinged at the hinge pin 8. As shown in FIG. 1A, when the cover is closed, the edge portion 3e and the stand 4 extend in opposing direction in reference to the hinge pin 6. However, as shown in FIG. 1B, when the cover 3 is opened, the stand 4 and the edge portion 3e are positioned adjacent to one another.

Stopper 15 is for keeping the cover 3 closed on the upper side of the main body covering a display 2. Cover 3 is removed from underneath stopper 15 when the operator opens cover 3. The operator preferably opens cover 3 by applying a lifting force in the direction "E" to overcome the stopping force exerted on cover 3 by stopper 15. Alternatively, stopper 15 can be slid away from cover 3 to allow cover 3 to be opened.

Figure 2:
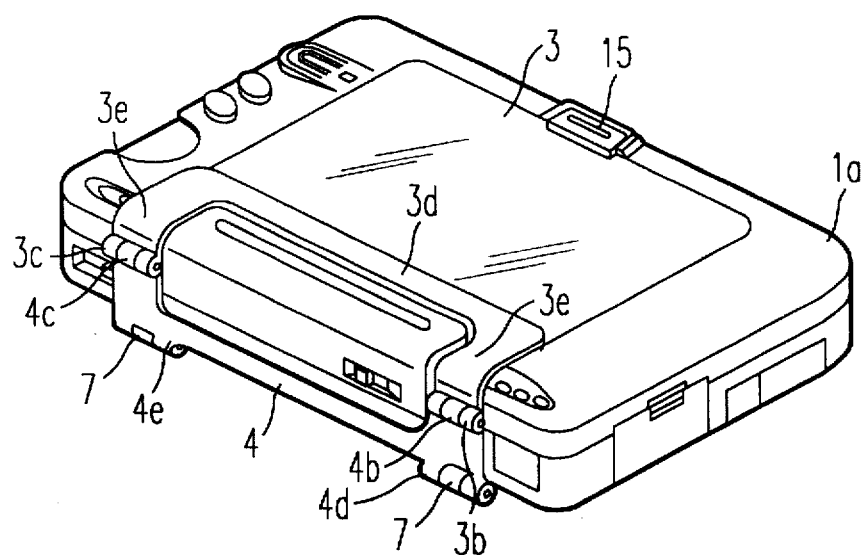
FIG. 2 is a perspective view of the portable computer shown with the display cover closed.
Figure 3:
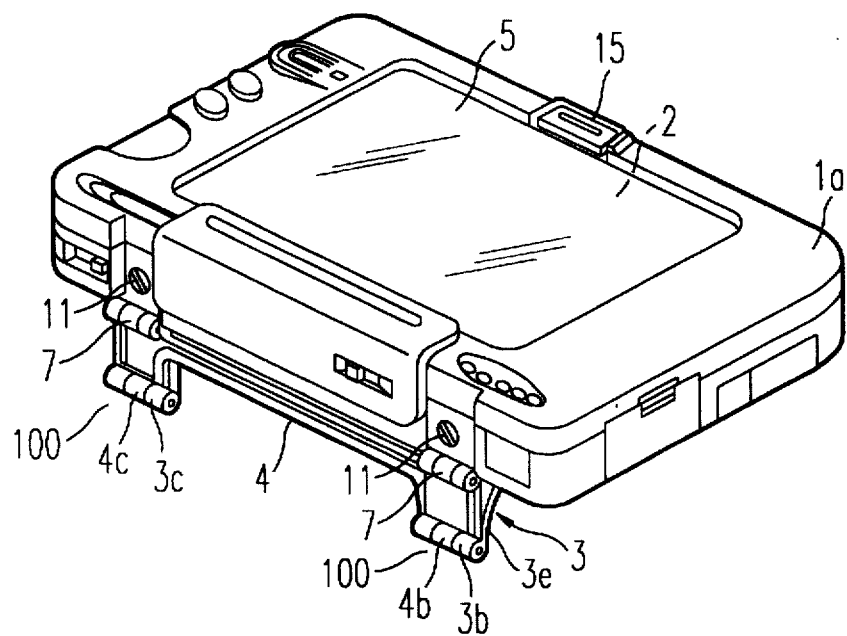
FIG. 3 is a perspective view of the portable personal computer shown with the display cover opened.

FIGS. 2 and 3 are perspective views of the same portable computer showing the cover 3 in closed and opened positions, respectively. The portable computer is normally used on a desk or on a user's palm and arm (forearm or wrist), although it is clear that the portable computer could also be used on other support arrangements (such as an operator's lap, or on a shelf, etc.). In FIG. 3, main body 1a of portable computer 1 has a display 2 which displays image or character information, and includes a touch panel 5 for inputting data. Data is input to portable computer 1 by touching a touch panel 5 by a pen, finger or by applying pressure to touch panel 5 with another instrument. As shown in FIG. 2, cover 3 protects the display 2 from shock, incidental contact, dust, etc.

Figure 4:
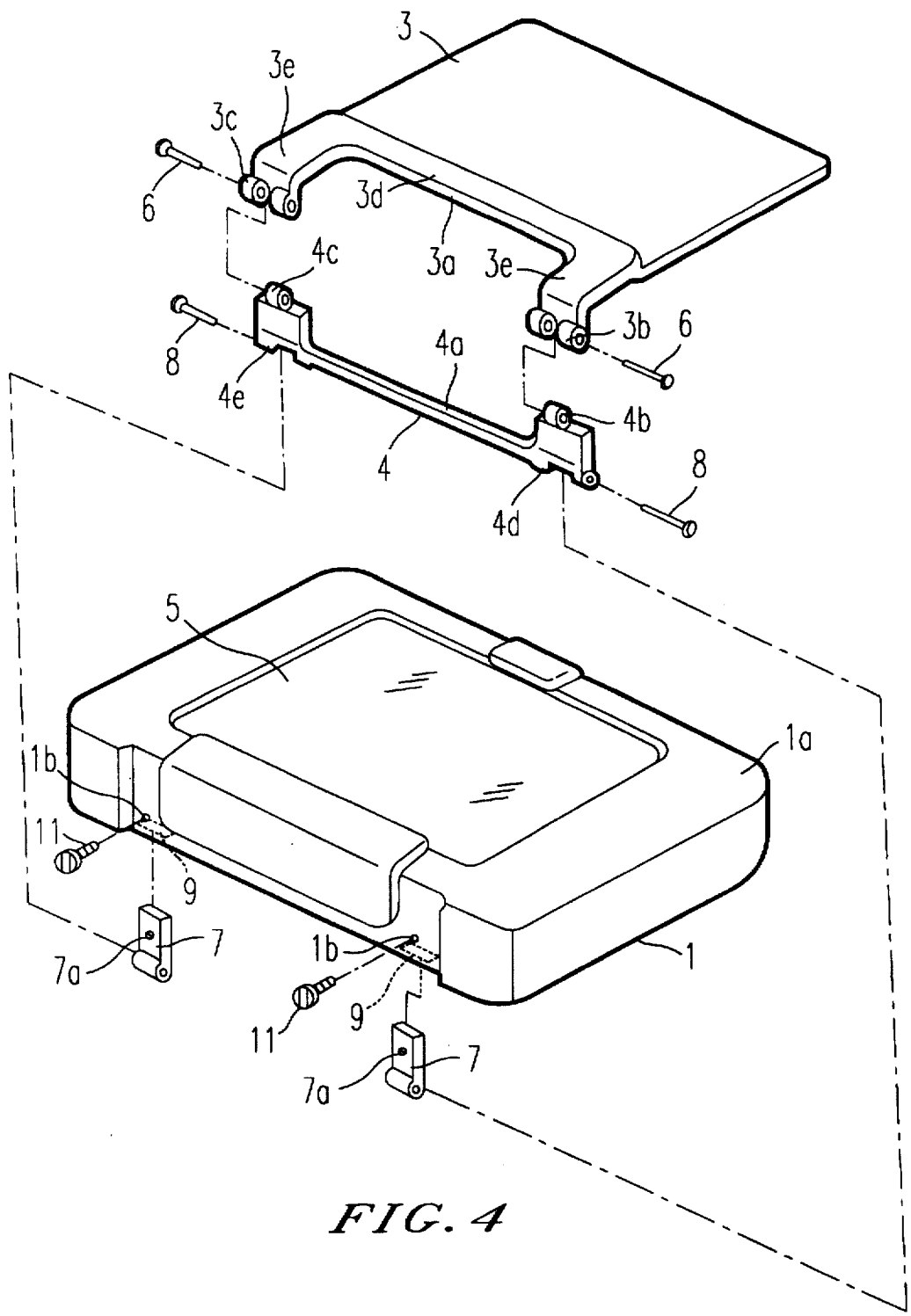
FIG. 4 is an exploded perspective view of the stand attaching to the main body of the personal computer.

FIG. 4 is an exploded perspective view of the portable personal computer 1 and shows how the stand 4 and cover 3 attach to main body 1a. In FIG. 4, cover 3 has an edge portion 3e that is "L" shaped when viewed in a cross-sectional view, see FIG. 1A. Furthermore, cover 3 has notch 3a formed in a center portion of the edge portion 3e as shown in FIG. 4. Hinges 3b and 3c of the edge portion 3e are positioned as shown in FIG. 4.

The portable computer includes stand 4 which has a notch 4a corresponding in shape and position to the notch 3a, and has hinges 4b and 4c which form first rotatable joints with corresponding hinges 3b and 3c by pins 6. The first set of rotatable joints, formed by hinges 3b, 4b and 3c, 4c, are on a first side of stand 4 and permit the cover 3 to rotate about the first side of stand 4. The stand 4 also has hinges 4d and 4e disposed on a side of stand 4 opposite to the side on which hinges 4b and 4c are formed. Hinges 4d and 4e form second rotatable joints with holders 7 by pins 8.

Stand 4 attaches to main body 1a by the rotatable joints formed with holders 7 and pins 8. The second set of rotatable joints, formed by hinges 4d and 4e with holders 7 and pins 8, permit the stand 4 to be stored and released as shown in FIGS. 1a and 1b respectively. When stand 4 is stored, the first rotatable joints are proximate the upper surface of main body 1a, so that cover 3 may be fully closed by rotating the cover 3 about the first rotatable joints. When stand 4 is released, it is rotated away from the main body 1a such that a riser 100, comprising opposing protrusions, is formed (see FIGS. 6 and 7). Cover 3 may be fully opened by rotating cover 3 about the first rotatable joints, and seating an upper surface of cover 3 against a bottom surface of main body 1a.

Figure 5:
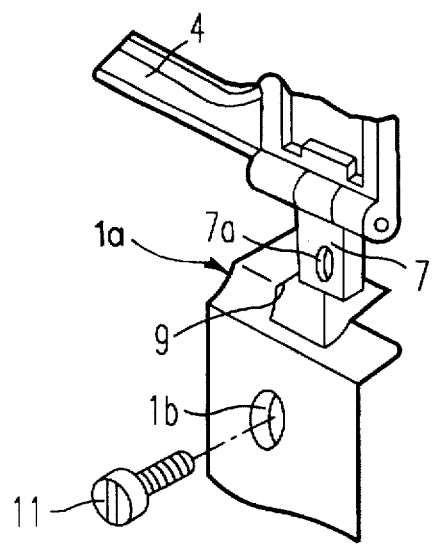
FIG. 5 is an enlarged fragmentary perspective view of the stand attaching to the main body of the portable personal computer.

FIG. 5 is an enlarged fragmentary perspective view of the portable personal computer 1. In FIG. 5, holders 7 are inserted into square-shaped holes 9 that are formed in the main body 1a. When holder 7 is positioned in holes 9, threaded holes 7a formed through holder 7 align axially with bore 1b, which is formed in main body 1a. Screws 11, a preferred attaching means, are received in holes 7a and bore 1b such that screws 11 attach holders 7 to main body 1a of the personal computer 1. Thus screws 11 permit stand 4 to be attached to, and detached from, main body 1a of personal computer 1. The screws 11 are preferably coin-screws which permit screws 11 to be tightened and loosened by a coin. Thus, this structure permits cover 3 and the stand 4 to be detached from main body 1a.

As shown in FIGS. 1a, 1b, and 4, cover 3 has a smooth convex shaped plate portion 3d, and main body 1a has a smooth concave shaped portion 1c formed on the bottom of the main body 1a. The smooth convex shaped plate portion 3d corresponds to the smooth concave shaped portion 1c such that convex shaped plate portion 32 is seated within concave shaped position 1c when the cover 3 is opened (see FIG. 1B).

Figure 6:
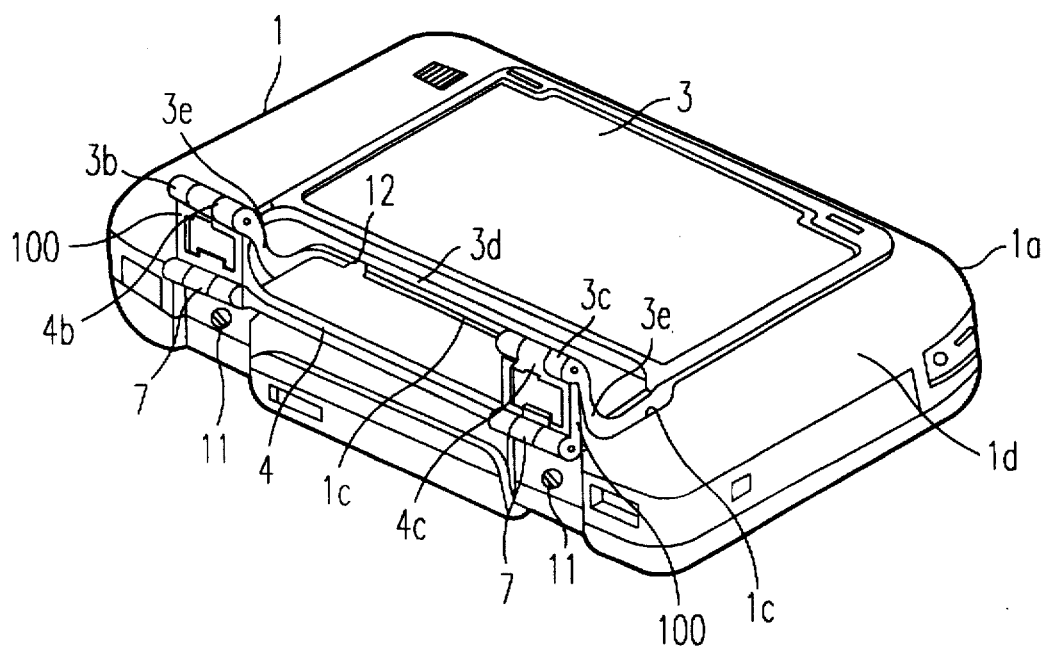
FIG. 6 is perspective view of a bottom of the portable personal computer shown with the display cover opened.

FIG. 6 is perspective view of a bottom 1d of the portable personal computer 1 when cover 3 is opened and plate portion 3d is seated within portion 1c. In FIG. 6, the bottom 1d of the portable computer 1 with the cover 3 opened is almost flat except that hinges 3b, 4b and 3c, 4c, and the edge portion 3e of cover 3 protrude away from the bottom 1d. These protrusions serve as a riser for elevating one side of the portable computer 1 when used on a desk, and stabilize the portable computer when grasped by an operator when the portable computer is used on a palm and wrist.

In FIG. 6, at least one latch 12 (preferably one) serves as a stopper which latches the cover 3 on an edge of the concave shaped portion 1c. The latch 12 keeps cover 3 positioned against the bottom 1d, and plate 3d seated within concave shaped portion 1c.

Figure 7:
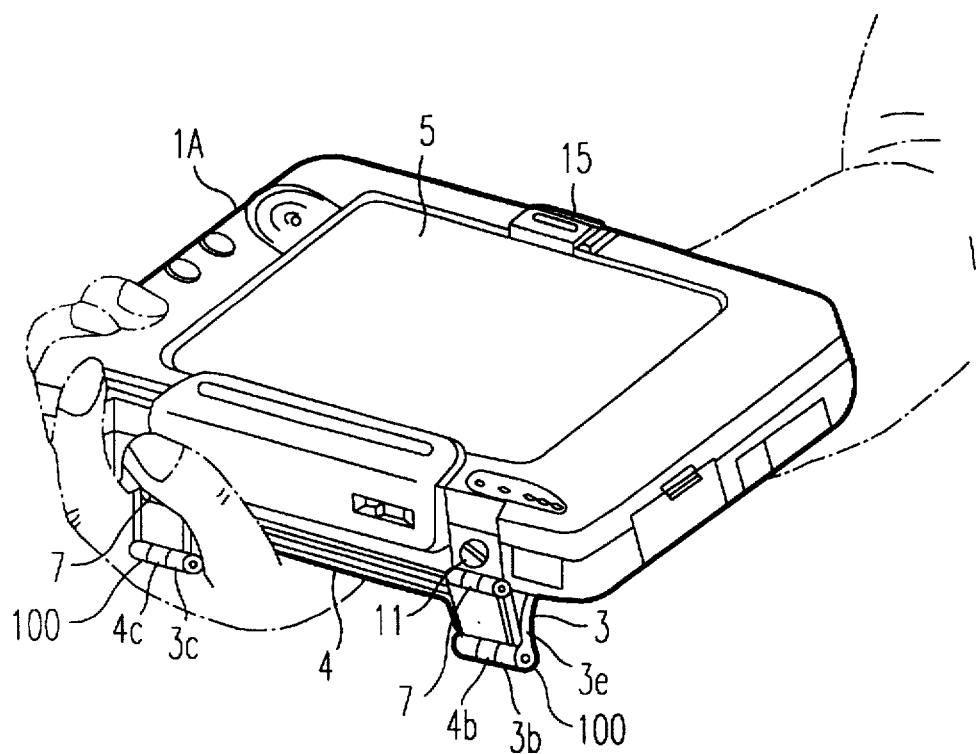
FIG. 7 illustrates a normal operating mode where the portable computer is held on an operator's palm and wrist.
Figure 8:
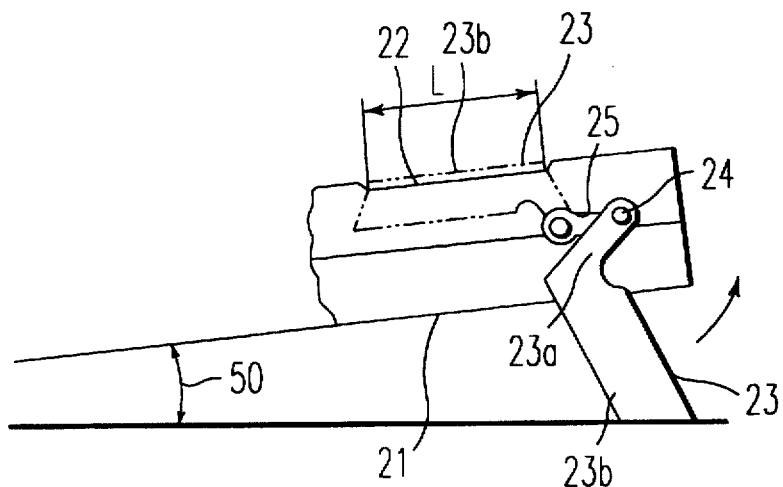
FIG. 8 illustrates a prior art calculator having a cover that is also used for a stand.
Figure 9A:
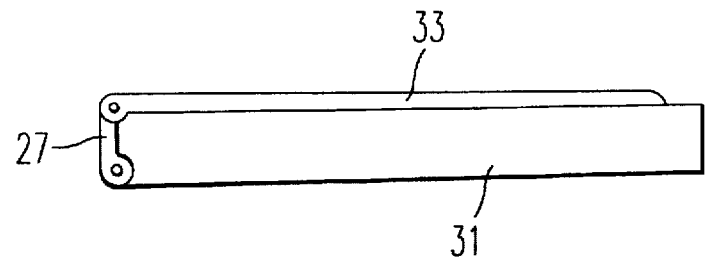
FIG. 9A illustrates a prior art personal computer having a cover that is also used for a stand, shown with the display cover closed.
Figure 9B:
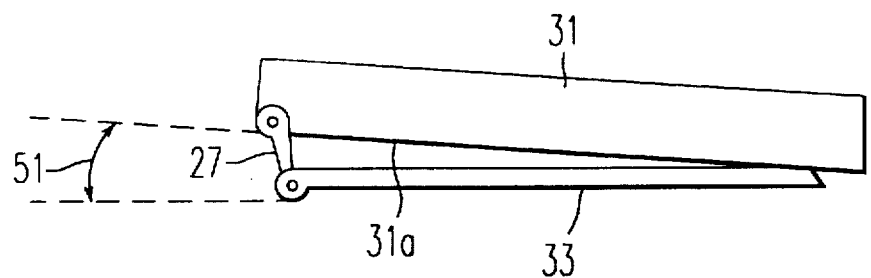
FIG. 9B illustrates a prior art personal computer having a cover that is also used for a stand shown with the display cover opened.

FIG. 7 illustrates an operating mode where the portable computer is held on an operator's palm and arm. As shown, the operator comfortably holds the protrusion (formed by edge portion 3e of cover 3 a first rotatable joint formed by hinges 3c, 4c and holder 7) between the operator's thumb and forefinger in order to stabilize the portable computer and supports main body 1a on the operator's palm and wrist.

FIG. 7 illustrates an operator stabilizing the portable computer using a left hand. The operator could just as easily stabilize the portable computer with a right hand because the edge portions 3e, hinges and holders 7 are on each side of the main body 1a. Thus, the portable computer is equally convenient for use by "southpaws" (left-handed users).

Obviously, numerous modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A portable computer comprising:

a main body having an upper side and a bottom side;

a display disposed on the upper side of said main body for display data;

a cover which covers said display when closed and which opens rotatably to a position where an upper side of said cover touches the bottom side of said main body;

a riser for raising one side of said main body when said cover is opened and when supported by a flat surface to position the main body at an angle relative to the flat surface, and for stabilizing the portable computer when supported on an operator's palm and forearm, wherein said cover has a convex shaped portion and said main body has a concave shaped portion formed on the bottom side of the main body corresponding to said convex shaped portion.

2. The portable computer of claim 1, wherein said main body has a stopper which latches said cover on said concave shaped portion.

3. A portable computer comprising:

a main body having an upper side and a bottom side;

a display disposed on the upper side of said main body for displaying data;

a cover which covers said display when closed and which opens rotatably to a position where an upper side of said cover touches the bottom side of said main body;

a riser for raising one side of said main body when said cover is opened and when supported by a flat surface to position the main body at an angle relative to the flat surface, and for stabilizing the portable computer when supported on an operator's palm and forearm, wherein said cover has an edge, and a cover notch formed in a center of the edge, and said riser has a stand notch which corresponds in shape and position to said cover notch.

4. A portable computer comprising:

a main body with an upper side a bottom side, and a side surface that is between said upper side and said bottom side;

a display disposed on the upper side of said main body for displaying data;

a cover means for covering said display with a first portion thereof when said cover means is closed and for rotatably opening said cover means to a position where an upper side of said cover means touches the bottom side of said main body, said cover means comprising an edge portion configured to cover a portion of said side surface when said cover means is closed;

means for raising one side of said main body when said cover means is opened and supported by a flat surface so as to position the main body at a predetermined angle relative to the flat surface, said means for raising comprising grasping means for being grasped by at least one finger on a hand of an operator and for stabilizing the portable computer when supported on a palm of said hand of said operator and a forearm of said operator, said means for raising further comprising, a stand plate having a first end and a second end, a first hinge pin coupled to said first end of said stand plate and coupled to an end of said edge portion of said cover means, said edge portion of said cover means and said stand plate extending in generally opposing directions about said first hinge pin when said cover means is closed, and being positioned adjacent to each other when said cover means is opened, a holder being fixed to said main body proximate said side surface and said bottom side of said main body, a second hinge pin coupled to said holder and said second end of said stand plate, said stand plate being disposed adjacent to said side surface of said main body when said cover means is closed, said holder and said stand plate extending in generally opposing directions from said second hinge pin when said cover means is opened.

5. A portable computer comprising:

a main body having an upper side, a bottom side, and a side surface between said upper side and said bottom side;

a display disposed on the upper side of said main body for displaying data;

a cover having, a first portion which covers said display, and an edge portion which covers a portion of said side surface when said cover is closed, said first portion of said cover being configured to contact the bottom side of said main body when said cover is opened;

a hinge apparatus configured to open and close said cover, comprising, a stand plate having a first end and a second end, a first hinge pin coupled to said first end of said stand plate and coupled to an end of said edge portion of said cover, said edge portion of said cover and said stand plate extending in generally opposing directions about said first hinge pin when said cover is closed, and positioned adjacent to each other when said cover is opened, a holder portion fixed to said main body proximate said side surface and said bottom side of said main body, a second hinge pin coupled to said holder portion and said second end of said stand plate, said stand plate being disposed adjacent to said side surface of said main body when said cover is closed, said holder portion and said stand plate extending in generally opposing directions with respect to said second hinge pin when said cover is opened, wherein said stand plate and said edge portion of said cover form a riser that protrudes away from the bottom side of said main body when said cover is opened, said riser being configured to be grasped by an operator so as to stabilize the portable computer when supported on a palm and a forearm of said operator, said riser being configured to raise one side of said main body when said cover is opened and when supported by a flat surface so as to position the main body at an angle relative to the flat surface.

6. The portable computer of claim 5, wherein said display includes a touch panel for inputting data to the portable computer when touched.

7. The portable computer of claim 5, wherein said edge portion has an L-shaped cross-section.

8. The portable computer of claim 5, wherein said cover has said edge portion, and a cover notch being formed in a center of the edge portion.

9. The portable computer of claim 5, wherein the holder portion rotatably attaches the stand to the main body and includes means for detachably attaching said stand from the main body.

10. The portable computer of claim 9, wherein said means for detachably attaching comprises a screw.

* * * * *